(12) United States Patent
Holzwarth et al.

(10) Patent No.: US 10,837,414 B2
(45) Date of Patent: Nov. 17, 2020

(54) HOLLOW FILTER ELEMENT, FILTER HOUSING AND FILTER

(71) Applicant: Mann+Hummel GMBH, Ludwigsburg (DE)

(72) Inventors: Marcel Holzwarth, Fayetteville, NC (US); Nadine Sorger, Fellbach (DE); Pedro Miguel Pereira Madeira, Bietigheim-Bissingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 631 days.

(21) Appl. No.: 14/969,373

(22) Filed: Dec. 15, 2015

(65) Prior Publication Data

US 2016/0123282 A1 May 5, 2016

Related U.S. Application Data

(63) Continuation of application No. PCT/EP2014/060970, filed on May 27, 2014, which
(Continued)

(30) Foreign Application Priority Data

Jun. 20, 2013 (DE) .................. 10 2013 010 218
May 13, 2014 (DE) .................. 10 2014 006 853

(51) Int. Cl.
*F02M 35/024* (2006.01)
*B01D 46/00* (2006.01)
(Continued)

(52) U.S. Cl.
CPC ... *F02M 35/02483* (2013.01); *B01D 46/0005* (2013.01); *B01D 46/009* (2013.01);
(Continued)

(58) Field of Classification Search
None
See application file for complete search history.

(56) References Cited

U.S. PATENT DOCUMENTS 4,120,671 A * 10/1978 Steinmeyer ........ B01D 39/2017
    95/281
4,136,009 A * 1/1979 Samiran ............. B01D 17/0214
    210/114
(Continued)

FOREIGN PATENT DOCUMENTS

DE  102005025192 A1  12/2005
DE  202008001819 U1   6/2009
EP       2213869 A2   8/2010

*Primary Examiner* — Christopher P Jones
*Assistant Examiner* — Brit E. Anbacht
(74) *Attorney, Agent, or Firm* — James Hasselbeck

(57) ABSTRACT

A hollow filter element, including: a filter medium (64) for filtering the fluid, the filter medium circumferentially surrounding an element interior space (72) in relation to an element axis (32), forming a conical-oval round filter element; wherein the hollow filter element (18) includes: at least at one outer face facing away from the element interior space (72) at an end face (66); at least one support element (78) configured to support the hollow filter element (18) at a housing-sided support section (42) of a filter housing (12); and at least one fluid passage (81) arranged at the end face
(Continued)

(66) in the center of the at least one support element (78), the at least one fluid passage connected to the element interior space (72) for connecting a secondary fluid line connector (45) of a housing-sided secondary fluid line (47) and/or for receiving a housing-sided positioning dome (245).

10 Claims, 9 Drawing Sheets

Related U.S. Application Data is a continuation of application No. 14/017,767, filed on Sep. 4, 2013, now Pat. No. 9,726,123.

(51) Int. Cl.
  *B01D 46/24* (2006.01)
  *F02M 35/02* (2006.01)
  *F02M 35/09* (2006.01)

(52) U.S. Cl.
  CPC ...... *B01D 46/0041* (2013.01); *B01D 46/2411* (2013.01); *B01D 46/2414* (2013.01); *F02M 35/0203* (2013.01); *F02M 35/0204* (2013.01); *F02M 35/02416* (2013.01); *F02M 35/02425* (2013.01); *F02M 35/02433* (2013.01); *B01D 2265/026* (2013.01); *B01D 2275/201* (2013.01); *B01D 2275/208* (2013.01); *F02M 35/09* (2013.01)

(56) References Cited

U.S. PATENT DOCUMENTS

| | | | | |
|---|---|---|---|---|
| 4,203,739 | A | * | 5/1980 | Erdmannsdorfer ........................ B01D 46/0024 210/315 |
| 4,353,722 | A | * | 10/1982 | Berz .................. B01D 46/0058 55/294 |
| 4,354,362 | A | * | 10/1982 | Schumacher .......... B01D 15/00 210/DIG. 6 |
| 4,632,682 | A | * | 12/1986 | Erdmannsdorfer ........................ B01D 46/0024 210/315 |
| 6,152,979 | A | | 11/2000 | Cappuyns |
| 7,122,067 | B2 | | 10/2006 | Prellwitz et al. |
| 8,147,576 | B2 | | 4/2012 | Gillenberg |
| 8,657,900 | B2 | | 2/2014 | Menssen |
| 8,673,042 | B2 | | 3/2014 | Langner |
| 8,940,070 | B2 | | 1/2015 | Traub |
| 9,132,371 | B2 | | 9/2015 | Heim et al. |
| 2006/0261002 | A1 | | 11/2006 | Dworatzek et al. |
| 2009/0094951 | A1 | | 4/2009 | Baseotto |
| 2013/0146524 | A1 | * | 6/2013 | Veit ........................ B01D 17/10 210/300 |
| 2014/0260136 | A1 | | 9/2014 | Kaiser |
| 2014/0298612 | A1 | * | 10/2014 | Williams .................. A47L 9/10 15/347 |
| 2016/0144310 | A1 | * | 5/2016 | Movia ................ B01D 46/0024 55/478 |
| 2017/0291129 | A1 | * | 10/2017 | Sorger ............... B01D 46/2411 |

\* cited by examiner

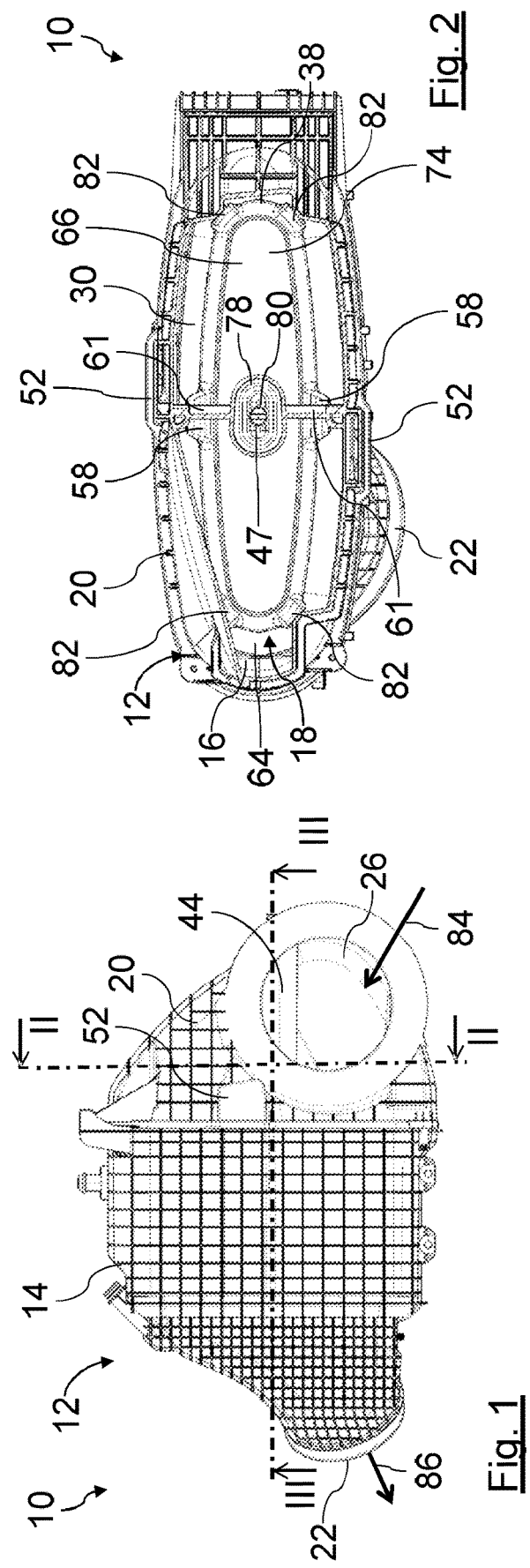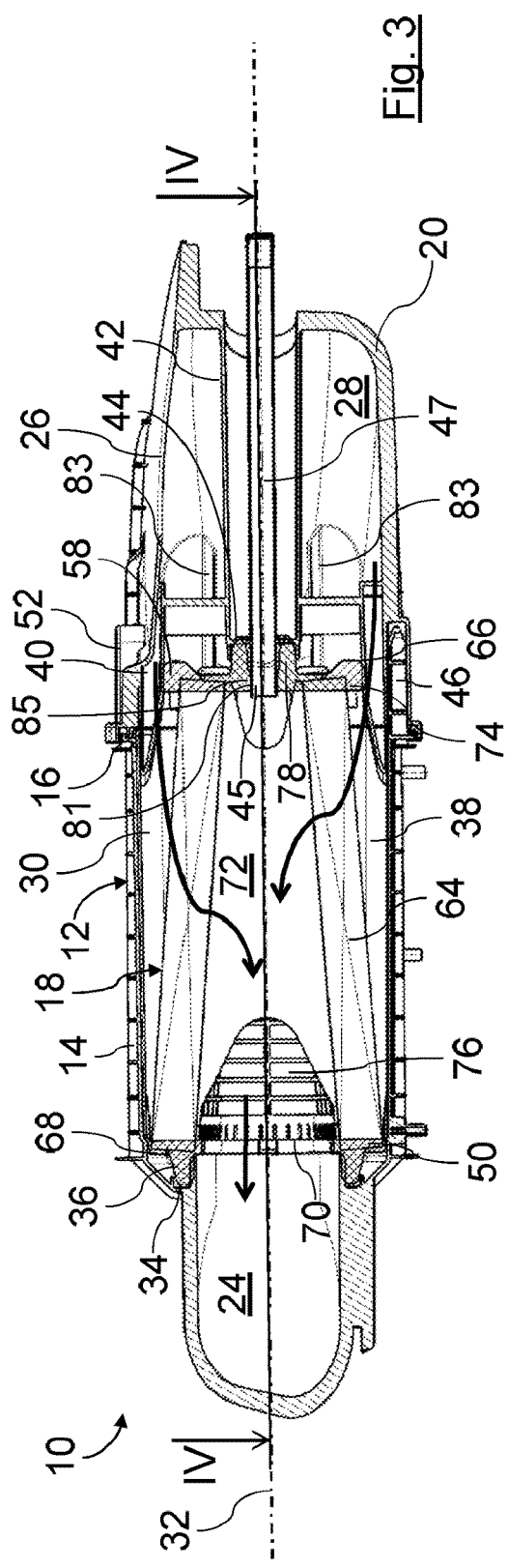

HOLLOW FILTER ELEMENT, FILTER HOUSING AND FILTER

TECHNICAL FIELD

The present invention relates to a hollow filter element, in particular a conical-oval round filter, of a filter for fluids, in particular air, water, fuel, oil or urea hydrous solution, in particular of an air filter, in particular of an internal combustion engine, in particular of a motor vehicle, in particular of a commercial vehicle, having a filter medium for filtering the fluid, which circumferentially surrounds the element interior space in relation to an element axis, and the hollow filter element has at least at one outer face facing away from the element interior space at an end face at least one support element for supporting the hollow filter element at a housing-sided support section of a filter housing of the filter.

Furthermore, the present invention relates to a filter housing of a filter for fluids, in particular air, water, fuel, oil or urea hydrous solution, in particular of an air filter, in particular of an internal combustion engine, in particular of a motor vehicle, in particular of a commercial vehicle, which may be opened, which has at least one inlet for fluid to be cleaned and at least one outlet for cleaned fluid, and in which a hollow filter element, in particular a hollow filter element according to the present invention, having a filter medium for filtering the fluid, which surrounds an element interior space in relation to an element axis, may be replaceably positioned in such a manner that it separates the at least one inlet from the at least one outlet, and at least one housing-sided support section is situated in/at the filter housing, at which the hollow filter element may be supported by at least one support element located at one of the front faces of the hollow filter element, and at least one secondary fluid line and/or at least one positioning device is provided on the sides of the filter housing.

Moreover, the present invention relates to a filter for fluid, in particular air, water, fuel, oil or urea hydrous solution, in particular an air filter, in particular of an internal combustion engine, in particular of a motor vehicle, in particular of a commercial vehicle, having a filter housing which may be opened, in particular a filter housing according to the present invention, in which a hollow filter element is situated

BACKGROUND OF THE INVENTION

An air filter device for an internal combustion engine of a motor vehicle is known from EP 2 213 869 A2. In this instance, an air filter is supported in an air filter housing by a support. The support is, at least in areas, through-flowable by air and has a connection piece for connecting a secondary air line. Thus, air from the air filter device may be supplied via the support to a secondary air system.

SUMMARY OF THE INVENTION

The object of the present invention is to design a hollow filter element, a filter housing and a filter of the art mentioned at the outset, in which a secondary fluid line may be simply realized.

This object is achieved according to the present invention in that the hollow filter element has at the end face in the center of the at least one support element at least one fluid passage particularly connected to the element interior space for connecting a secondary fluid line connector of a housing-sided secondary fluid line and/or for receiving a housing-sided positioning dome.

According to the present invention, a fluid passage is combined with at least one support element. The at least one fluid passage may, in particular, pass through the at least one support element. In this manner, the required installation space may be reduced. This may have a particularly positive effect on the dirt retention capacity of the fluid filter. When used in combination with an air filter, the dust holding capacity may be improved in this manner. Furthermore, pressure losses between the clean fluid side and the raw fluid side of the filter medium may be reduced.

Advantageously, a housing-sided secondary fluid line connection may be connected to the fluid passage. Preferably, the secondary fluid line connector may be inserted in or pushed through the at least one fluid passage. Alternatively or additionally, a housing-sided positioning dome may be inserted in or pushed through the at least one fluid passage. The secondary fluid line connector and/or the positioning dome may center and position the hollow filter element more accurately in the transverse direction, in particular, radially to the element axis. The secondary fluid line connector and/or the positioning dome may also serve as a positioning device. Furthermore, the secondary fluid line connector and/or the positioning dome may span the hollow filter element in the axial direction in the filter housing. When operating the filter, the secondary fluid line connector and/or the positioning dome may keep and fix the hollow filter element securely in its position, in particular in the event of driving movements in a motor vehicle and/or vibrations. In particular, the hollow filter element may be protected from sliding in the transverse direction.

When using the positioning dome, said dome may seal off the fluid passage. In this manner, the hollow filter element may be used also in connection with a filter housing which does not have a corresponding secondary fluid line.

Advantageously, the secondary fluid line connector and/or the positioning dome may be made of plastic or include plastic material.

Advantageously, the secondary fluid line connector and/or the positioning dome may taper at its/their free end. In this manner, said secondary fluid line connector and/or positioning dome may more easily be inserted in or pushed through the fluid passage.

The at least one support element may be supported at least transversely to the element axis, in particular radially or tangentially to the element axis or radially to another axis which may run parallel to the element axis. In this manner, the hollow filter element may be positioned and held in the radial direction in relation to the element axis.

Advantageously, the at least one support element may additionally be supported in the axial direction in relation to the element axis in the filter housing. In this manner, the axial position of the hollow filter element may also be improved. The hollow filter element may be advantageously clamped and held in the radial direction between two opposite lying support sections of the filter housing.

The expansion of the filter medium may, at least in one direction radial to the element axis, be smaller at one of its end faces than at the other end face. The filter medium may particularly be conical. Advantageously, the at least one support element and the at least one fluid passage may be located on the smaller end face.

Advantageously, the at least one support element may be located on a raw fluid side of the hollow filter element. Alternatively or additionally, at least one support element may be located on a clean fluid side.

Advantageously, at least one support element may be centrally positioned in relation to the element axis at the end face of the hollow filter element. In this way, the hollow filter element may be supported at the center. In this manner, an improved support of the hollow filter element at the filter housing may result by using only one support element and only one corresponding housing-sided support section. In this way, the support may be realized by requiring little space for the necessary components in the filter housing.

Advantageously, the at least one support element may be at least partially elastic. In this manner, the at least one support element may easily adjust to possible fitting tolerances of the hollow filter element in the filter housing. Furthermore, the at least one support element may additionally serve as a vibration buffer, in particular when operating the filter. Moreover, an elastic support element may more easily seal off the fluid passage having the secondary fluid line connector and/or the positioning dome. A sealing may be carried out by overpressing the elastic material, particularly polyurethane foam. In this way, additional sealing elements may be foregone.

Advantageously, the at least one support element may be made up of an elastic plastic, particularly polyurethane (PUR). Polyurethane may be easily connected with the end body. The at least one support element may advantageously be foamed at or on such an end body.

The element axis and/or the housing axis of the filter housing may advantageously run parallel or coaxially to each other. Advantageously, the element axis and/or the housing axis may run parallel or coaxially to a mounting axis of the filter element in the filter housing. In this way, the hollow filter element may easily be inserted into the filter housing. In particular, the hollow filter element may be inserted in the axial direction in a corresponding housing part, particularly a housing pot, of the filter housing.

Advantageously, an installation axis, in which both housing parts are assembled or separated, may run parallel or coaxially to the element axis and/or to the housing axis and/or to the mounting axis.

Advantageously, one of the housing parts, in particular a housing cover, may be inserted onto the hollow filter element and onto/into the other housing part, in particular a housing pot.

The hollow filter element advantageously may be a round filter element having a round cross section; an oval round filter element having an oval cross section; a flat-oval round filter element having a flattened oval cross section; a conical round filter element in which the round cross section tapers in the axial direction to the element axis; a conical-oval round filter element in which the oval cross section tapers in the axial direction to the element axis at least in the direction of one transverse axis; a conical flat-oval round filter element in which the flat-oval cross section tapers in the axial direction to the element axis at least in the direction of one transverse axis; or a hollow filter element having another type of cross section, particularly rectangular, and/or another type of cross section variation in the direction of the element axis.

The filter medium may advantageously be circumferentially closed, in particular, be pleated in a star formation, in particular in a zigzag or wavy shape. The filter medium may also be circumferentially closed in a non-pleated manner. The filter medium may be pleated into a filter bellows.

The filter medium may be filter paper, filter fleece or another type of filter medium suitable for filtering the fluid, particularly air. The filter medium may have a single layer or a plurality of layers.

The filter may advantageously be an air filter. The filter advantageously may be part of an air intake passage of an internal combustion engine. It may be used to clean combustion air which is supplied to the internal combustion engine.

The present invention is, however, not limited to an air filter of an air intake passage of an internal combustion engine of a motor vehicle, in particular of a heavy goods vehicle. Rather, the present invention may also be used for other types of air systems of motor vehicles. Advantageously, the air filter may be also an interior cabin filter. The filter, in particular air filter, may be also used outside of the motor vehicle technology, in particular, for industrial motors. Advantageously, the filter may be part of a utility machine, in particular of a construction machine or of a utility vehicle, particularly a construction vehicle, in particular of a heavy goods vehicle, a bus, a construction machine or an agricultural machine.

The present invention may be also used for exhaust gas purification for internal combustion engines or combustion equipment.

Advantageously, the secondary fluid line may be a secondary air line. The secondary air line may lead to a compressor of a breaking system of a motor vehicle. In this way, the compressor may be supplied with cleaned air. The at least one fluid passage may serves as a compressed air connection.

The secondary fluid line may be or have a hose, a duct, a pipe or another type of fluid line component. The secondary fluid line may be connected to corresponding fluid lines outside of the filter housing.

In an advantageous embodiment, the at least one support element may have at least one cavity which, at least when the hollow filter element is not installed, may be connected with the at least one fluid passage and be open on its side facing away from the fluid passage.

At least one area of the housing-sided support section may be inserted through the open side into the at least one cavity. In this manner, a freedom of movement, particularly radial to an axis of the at least one support element, may be limited relative to the at least one support section.

Alternatively or additionally, the housing-sided secondary fluid line, in particular a fluid line connector of the secondary fluid line, may pass through the at least one cavity to the fluid passage. Advantageously, the housing-sided secondary fluid line may be positioned in a space-saving manner in or at the housing-sided support section.

The at least one support element may have at least one cylindrical and/or at least one conical section. A major axis of the at least one support element may run axially or parallel to the element axis. The at least one support element may be braced against the at least one respective housing-sided support section in a transverse and/or axial and/or parallel manner to the element axis.

The at least one support element may advantageously have an oval, flat-oval or round base area. It may also have another type of base area, in particular an angular base area.

Advantageously, the at least one support element may have a hollow cylindrical or sleeve-like section.

The hollow cylindrical or sleeve-like section of the at least one support element may, when the hollow filter element is correctly installed, advantageously be inserted into a respective groove at the end face, in particular a counter-support socket, of the at least one housing-sided support section. The groove may be regarded as a cavity of the housing-sided support section, which may be open in the direction of the free end face of the housing-sided support section.

In a further advantageous embodiment, the at least one fluid passage may have at least one portion of a sealing device for sealing against the secondary fluid line connector of the housing-sided secondary fluid line.

Advantageously, the at least one fluid passage may have at least one elastic section and/or at least one sealing receptacle for a seal. The at least one elastic section may advantageously be realized as a two-part component or as an insert. The at least one elastic section and/or the at least one seal may, when the hollow filter is installed, sealingly abut at a corresponding sealing section of the housing-sided secondary fluid line connector.

The sealing device advantageously may run circumferentially in relation to the fluid passage. In this manner, the sealing device may simply seal itself from a tube-like section of the secondary fluid line connector. The secondary fluid line connector advantageously may pass through the sealing device.

The sealing receptacle may be a sealing groove. The seal advantageously may be an O-ring seal.

In another advantageous embodiment, the at least one fluid passage may be connected to a clean fluid side of the filter medium.

In this manner, cleaned fluid may be conveyed via the fluid passage and the housing-sided secondary fluid line to a respective needed location. In this way, no additional fluid filter is required, as it is the case for air filter devices known from the prior art.

In a further advantageous embodiment, the hollow filter element may have at least at the at least one end face an end body, which may include the at least one fluid passage and which may be connected to or have at least one support element.

The at least one end body may mechanically stabilize the hollow filter element. In addition, the at least one end body may have a holding and/or connection function. Furthermore, the end body may seal the filter medium at the end face.

The end body advantageously may be made out of plastic. Advantageously, it may be adhesively bonded, welded or sealingly connected in another way to the end face of the filter medium. The material of which the end body is made or which the end body includes, may advantageously be foamed onto or into the end face of the filter medium.

The at least one end body may advantageously be an end plate. End plates have a low thickness compared to its radial expansion.

Advantageously, the at least one support element may be fixedly connected to the end body. The at least one support element may be adhesively bonded, welded or foamed or fixedly connected in a different way to the end body as a separate component. The at least one support element may particularly also be mechanically connected by means of a latching connection, a snap connection or in a different way to the end body. The at least one support element advantageously may be releasably or unreleasably connected to the end body.

Advantageously, the filter medium may have respectively one end body at each end face. Advantageously, the end body may, on the end face of the hollow filter element lying axially opposite of the support element, have a passage opening for the fluid.

In a further advantageous embodiment, the hollow filter element may have on at least one circumferential side in relation to the element axis at least one leveling element for supporting against the filter housing.

The at least one leveling element may position the at least one support element and the at least one fluid passage in a simple manner relative to the housing-sided support section and the housing-sided fluid connector.

Advantageously, the at least one leveling element may compensate different distances from the edges of the hollow filter element radial to the element axis at differently sized end faces of the hollow filter element. The at least one leveling element may achieve a height compensation. In this way, the hollow filter element may be aligned in the filter housing. In particular, when the hollow filter element is placed horizontally having a horizontally running element axis, different heights may, in this manner, be compensated at the differently sized front faces.

Furthermore, the at least one leveling element may serve as a positioning aid when installing the filter, in particular when fitting the hollow filter element in the filter housing and/or when closing the filter housing. By means of the at least one leveling element, the respective end face may be centered, in particular lifted. For this purpose, the filter housing may have at least one guiding portion interacting with the at least one leveling element, in particular, have at least one guide track. The at least one guiding portion may guide and/or position the at least one leveling element when installing the filter.

The at least one leveling element may advantageously be used as a spacer. Advantageously, by means of the at least one leveling element, a radial distance in relation to the element axis may be realized between the radial outer circumferential side of the hollow filter element at the corresponding end face and a corresponding opposite lying section of the filter housing. In this way, a gap may be realized between the hollow filter element in the area of the end face and an interior wall radially surrounding the hollow filter element at the outside. Fluid may get through the gap into or out of a space surrounding the filter medium radially on the outside, particularly an inlet annulus. In this way, fluid may flow, in particular axially to the element axis, from an inlet chamber section of the filter housing to the inflow side of the filter medium.

When the flow direction through the filter medium is from radially outside to radially inside, the inflow side of the filter medium is located at the radial outer circumferential side of the hollow filter element. The inflow side of the hollow filter element is then located in the element interior. The fluid flow may run axially to the element axis from the outflow side of the filter medium into a corresponding outlet chamber section of the filter housing. The axial fluid flow enables to realize an improved pack size of the filter housing and, therefore, smaller space requirements. Furthermore, in an axial fluid flow to the inflow side and/or away from the outflow side, a pressure difference between inflow and outflow side may be reduced. In this way, in particular a lower pressure difference may be realized than in a comparable filter in which the fluid flow is fed tangentially to the inflow side of the hollow filter element or discharged from the outflow side.

Advantageously, the element axis may, by means of the at least one leveling element, be aligned parallel, in particular coaxially, to the housing axis. In this manner, the filter may be constructed overall coaxially. In this way, the space requirements of the filter may be reduced.

Advantageously, the hollow filter element may have on opposite lying circumferential sides respectively at least one leveling element. In this manner, the hollow filter element may be braced on opposite lying sides against the filter housing. In this way, a more equal and/or precise guidance/positioning/holding may result in the filter housing.

Advantageously, the at least one leveling element may extend at least radially, in particular radially and axially, to the outside via the radial outer circumferential side of the filter medium.

In this way, the at least one leveling element enables a radial support. The at least one leveling element may achieve a distance between a radial outer circumferential side of the filter element and a corresponding circumferential side of the filter housing.

If the at least one leveling element in addition projects above the filter medium in the axial direction, an axial support may additionally result. In this manner, a tilting or canting of the hollow filter element may be counteracted relative to the housing axis.

The technical object is furthermore achieved by the filter housing in that the at least one secondary fluid line has at least one secondary fluid line connector and/or the at least one positioning device has at least one positioning dome for connecting to at least one of the fluid passages connected to the element interior space, which is located in the center of the at least one support element.

The advantages and features disclosed above within the context of the hollow filter element according to the present invention and in its advantageous embodiments apply correspondingly and vis-a-versa to the filter housing according to the present invention and its advantageous embodiments.

In a further advantageous embodiment, the at least one secondary fluid line may run in/at the at least one housing-sided support section and/or at least may be concomitantly formed by said support section.

In this manner, the at least one secondary fluid line may be realized in/at the at least one already existing housing-sided support section in a space-saving, simple and/or protected manner.

In a further advantageous embodiment, the at least one secondary fluid line may be realized by a fluid pipe, which may run within the at least one housing-sided support section.

In this manner, the support function of the housing-sided support section and the function of the fluid line of the secondary fluid line may be separated from each other. The support function and the function of the fluid line may, in this way, be optimized respectively separate from each other.

Advantageously, the secondary fluid line may project above the at least one housing-sided support section in the area of the secondary fluid line connector. In this manner, the secondary fluid line connector of the housing-sided secondary fluid line may lead into the fluid passage of the hollow filter element, while the at least one housing-sided support section may be braced next to the fluid passage.

In a further advantageous embodiment, the filter housing has at least two housing parts, in particular a housing pot and a housing cover, which may at least partially be separated from each other for installing/removing the hollow filter element, and the at least one housing-sided support section and the at least one housing-sided secondary fluid line may be connected to one of the housing parts, in particular the housing cover.

Advantageously, one of the housing parts of the filter housing, in particular the housing pot, may have an installation opening for the hollow filter element, which may be closed off by the other housing part, in particular the housing cover. Advantageously, the at least one support section on the housing side and/or the secondary fluid line connector may be centrally situated in/at the filter housing in relation to the housing axis, which may coincide with the element axis when the hollow filter element is installed. Advantageously, the installation opening may, when the hollow filter element is installed, be crossed by the housing axis/element axis in particular, coaxially to the housing axis/element axis.

In a further advantageous embodiment, at least one of the at least two housing parts, in particular a housing cover, may have at least one guide track, which extends at least along one imaginary main guide line in a plane with an installation axis of the hollow filter element into the housing part, particularly the housing cover, for guiding and supporting the at least one leveling element which is, in relation to the filter axis, situated radially outside at an end face, in particular at a first end body, of the hollow filter element.

The at least one leveling element may be guided along the at least one guide track when installing the hollow filter element.

In a further advantageous embodiment, at least one of the at least two housing parts, in particular the housing pot and/or the housing cover, may have at least one connecting lug for connecting to the respectively other component of the filter housing.

Advantageously, the corresponding other housing part, namely the housing cover and/or the housing pot, may have at least one lug receptacle fitting the at least one connecting lug. The at least one connecting lug may be inserted into the at least one lug receptacle for connecting the housing cover to the housing pot.

Advantageously, the at least one connecting lug may, when the housing cover is installed, be situated on the same circumferential side of the filter housing as the at least one leveling element. In this manner, the at least one leveling element may press from the inside against the at least one circumferential wall section of the housing cover and/or of the housing pot and the at least one connecting lug and/or the corresponding lug receptacle may hold up from the outside.

Advantageously, the at least one support element and the at least one support section on the housing side may have no sealing function. In this manner, the support function may be separated out and respectively optimized. A corresponding sealing function may be assigned to at least one other component pairing separated from the at least one support element and the at least one support section and be optimized in its own right.

Advantageously, the at least one support section may have at least one cylindrical and/or at least one conical portion. A major axis of the support section, in particular of the cylindrical/conical portion, may advantageously run axially or parallel to the housing axis. In this manner, the at least one support section and the at least one support element may, the hollow filter element being installed, have the same alignment.

Advantageously, the major axes of the at least one support element and the at least one support section may, the hollow filter element being installed, run coaxially. In this manner, the at least one support element may be simply inserted onto and/or into the support section. Advantageously, the major axes of the at least one support element and of the at least one support section may, the hollow filter element being installed, run parallel or axially to an installation axis of the filter element relative to the filter housing, in particular to the housing part having the at least one support section. In this manner, the at least one support element and the at least one support section may easily be automatically related when installing the filter element in the filter housing, in particular when assembling the filter housing. Advantageously, when attaching the housing cover to the housing pot, the at least one support element may easily be related to the at least one housing-sided support section and/or the fluid passage may easily be related to the housing-sided secondary fluid line connector.

Advantageously, the at least one support element may at least in sections complement the at least one housing-sided support section. In this way, the at least one support element may abut at nearly zero clearance at the at least one support section. In this manner, a reliable and stable support may simply result transversally, in particular, radially and/or tangentially, to the element axis and/or housing axis.

The at least one support section may advantageously have an oval, flat-oval or round base area. It may also have another type of base area, in particular an angular base area.

Advantageously, the at least one support section may have a groove at the end face, in particular a counter support socket, which extends circumferentially in relation to the major axis of the at least one support section. The groove may advantageously be positioned at an end face facing the hollow filter element of the at least one support section.

Alternatively or additionally, the at least one support section may advantageously have a hollow cylindrical or sleeve-like section.

Advantageously, the at least one housing-sided support section may be a type of buttress or dome, include said type of buttress or dome or be part of it. The at least one support element of the hollow filter element may be supported at the free end of the buttress or dome. The other end of the buttress or dome may be connected to the filter housing, in particular to the housing cover. In particular, it may be integrally connected to the filter housing.

The buttress or dome may advantageously extend through a section of the filter housing. In this manner, the hollow filter element may be supported in a space bridged by the buttress or dome to a corresponding housing wall of the filter housing. Advantageously, the section may be flown through by fluid when operating the filter. Depending on the flow direction in the filter housing, the section may be an inlet chamber section or an outlet chamber section.

The technical object is furthermore achieved by the filter according to the present invention in that a hollow filter element according to the present invention is situated in the filter housing.

The advantages and features disclosed above within the context of the hollow filter element according to the present invention and the filter housing according to the present invention and its advantageous embodiments apply correspondingly to the filter according to the present invention and its advantageous embodiments.

Advantageously, the filter housing may be a filter housing according to the present invention.

Advantageously, an inlet-sided inlet chamber section, an element space section, in which the hollow filter element may be situated, and an outlet-sided outlet chamber section of the filter housing may be arranged in series in a linear manner and along the flow path of the fluid through the filter. In this manner, an axial in-flowing of the fluid to the inflow side of the filter medium may be easily realized. Furthermore, an axial out-flowing of the filtered fluid from the clean fluid side of the hollow filter element may be achieved in this manner. Potential differences in pressure between the clean fluid side and the raw fluid side may be reduced in this manner. Advantageously, a main flow direction of the fluid from the inlet chamber section through the element space section into the outlet chamber section may be substantially axial to the element axis and/or the housing axis.

BRIEF DESCRIPTION OF THE DRAWINGS

Further advantages, features and details of the present invention result from the subsequent description in which exemplary embodiments of the present invention are described in more detail on the basis of the drawing. The skilled person appropriately views the features disclosed in combination in the drawing, description and the claims also individually and combines them to purposeful further combinations.

FIG. 1 shows a top view of an air filter of an internal combustion engine of a motor vehicle according to a first exemplary embodiment, having a filter housing made up of a housing pot and a housing cover, in which a conical-oval round filter is replaceably situated and which has an air connection for a compressor of a braking system of the motor vehicle;

FIG. 2 shows a cross section of the air filter from FIG. 1 along the cutting line II-II shown there;

FIG. 3 shows a first longitudinal section of the air filter from FIG. 1 along the cutting line III-III shown there;

In the figures, same components are provided with the same reference characters.

DESCRIPTION OF THE INVENTION

Figure 4:
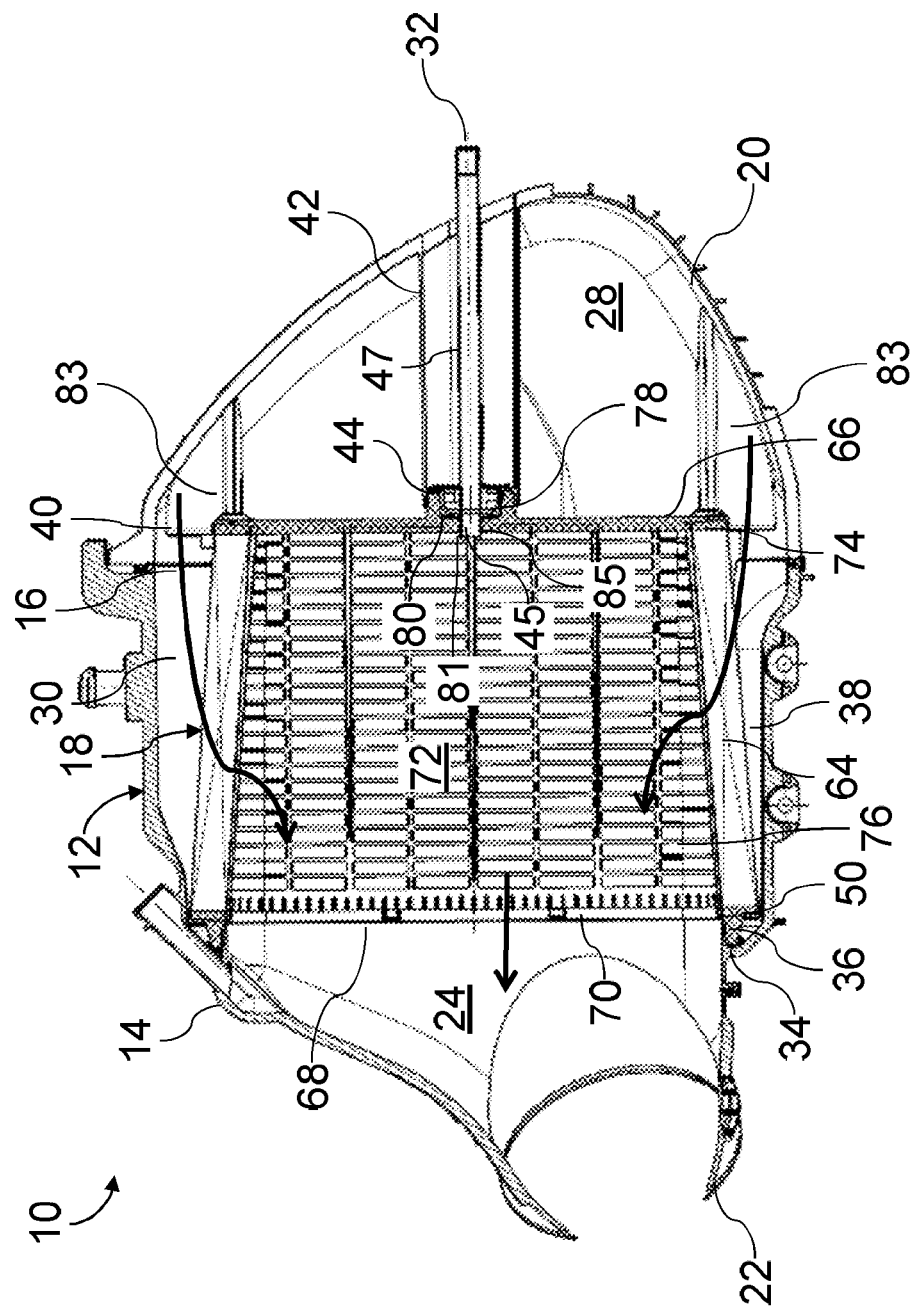
FIG. 4 shows a second longitudinal section of the air filter from FIG. 1 along the cutting line IV-IV from FIG. 3.
Figure 6:
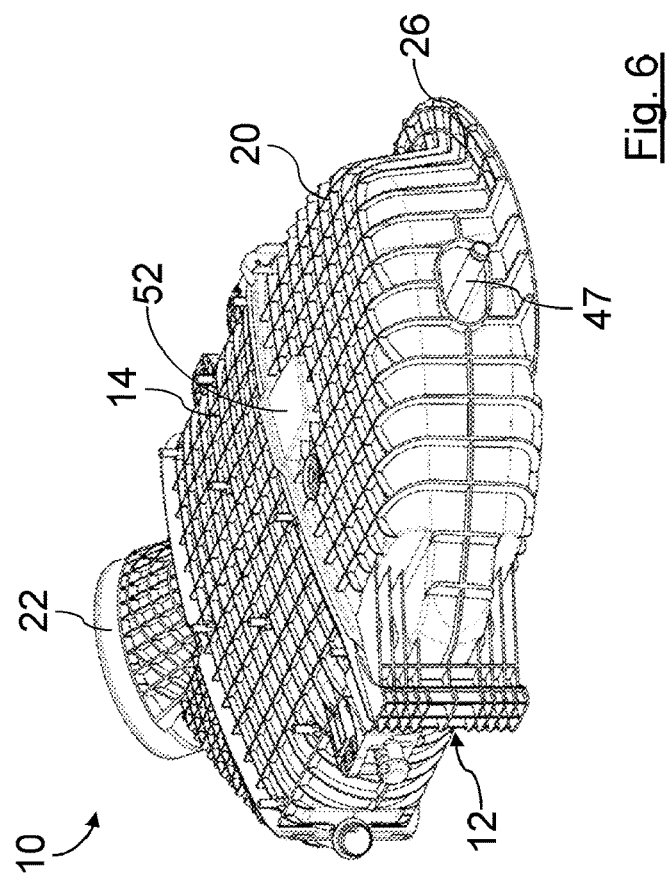
FIG. 6 shows a second isometric slanted view of the air filter from FIGS. 1 through 5.
Figure 5:
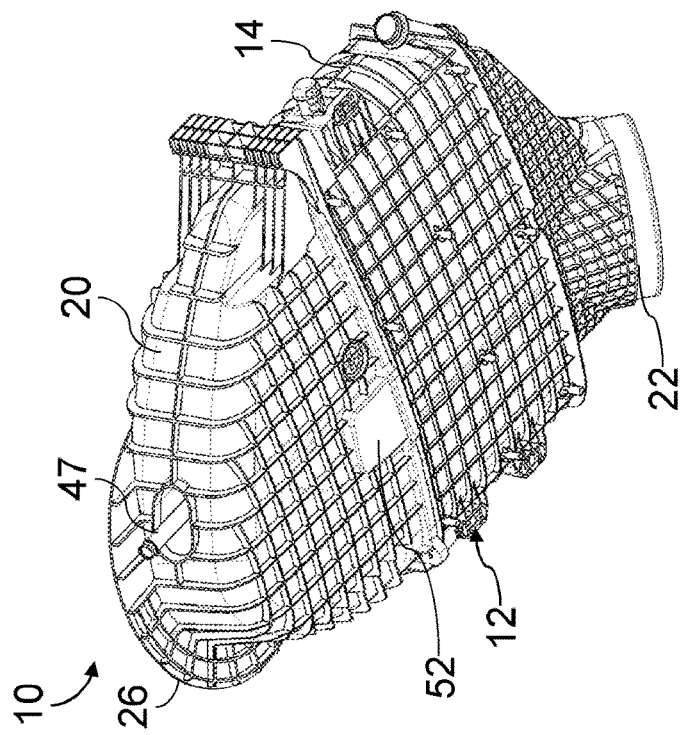
FIG. 5 shows a first isometric slanted view of the air filter from FIGS. 1 through 4.
Figure 7:
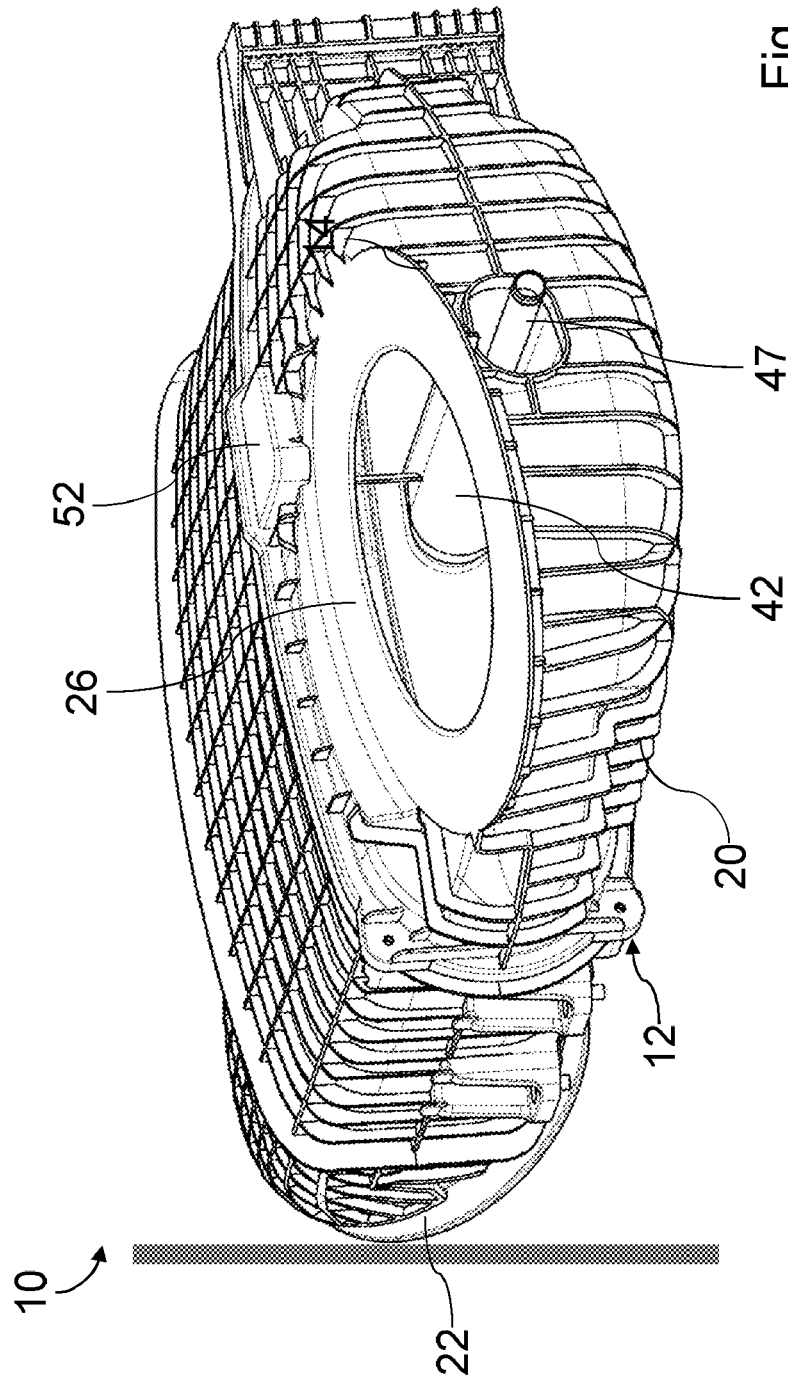
FIG. 7 shows a third isometric slanted view of the air filter from FIGS. 1 through 6.

FIGS. 1 through 11 show an air filter 10 of an internal combustion engine of a construction vehicle according to a first exemplary embodiment in different illustrations and installation phases. Air filter 10 is situated in an air intake tract of the internal combustion engine. It serves to clean combustion air supplied to the internal combustion engine for combustion.

Air filter 10 includes a filter housing 12 which may be opened. Filter housing 12 is flat-oval. Vis-a-vis an oval filter housing, filter housing 12 is flattened by an approximate elliptical cross section in the direction of its short transverse axis. Filter housing 12 has a housing pot 14, in FIGS. 1, 3 and 4 on the left. Housing pot 14 has an installation opening 16 which is, for example, shown in the foreground in FIG. 9, for installing filter element 18. Installation opening 16 is sealed by a housing cover 20, in FIG. 1 on the right.

Housing pot 14 has an outlet 22 for the filtered air, which runs into an outlet chamber section 24 of housing pot 14. Outlet 22 is connected outside of the filter housing 12 via not-shown air lines to the internal combustion engine.

Housing cover 20 has an inlet 26 for air to be filtered, which runs into an inlet chamber section 28 of housing cover 20 and is connected to the surroundings outside of filter housing 12.

Filter element 18 is situated in an element space section 30 of housing pot 14 in such a way that it separates inlet 26 from outlet 22. Element space section 30 is situated in a linear manner between inlet chamber section 28 and outlet chamber section 24.

Inlet chamber section 28, element space section 30 and outlet chamber section 24 are arranged in series axial to one and other filter axis 32 shown in FIG. 3.

In the shown exemplary embodiment, filter axis 32 coincides with a housing axis of filter housing 12 and, when filter element 18 is installed, with an element axis of filter element 18. In the present case, filter axis 32 also coincides with a mounting axis, along which filter element 18 may be inserted into or removed from housing pot 14. Moreover, filter axis 32 coincides with an installation axis, along which housing cover 20 may be mounted onto housing pot 14. For purposes of providing a better overview and understanding, the exemplary embodiment explained in the description refers to the axes listed above shortly as "filter axis 32". When in the following "axial", "radial", "circumferentially" or "coaxial" is mentioned, these terms relate, if not otherwise stated, to filter axis 32.

Installation opening 16 circumferentially surrounds filter axis 32. When filter element 18 is installed, filter axis 32 crosses installation opening 16. The interior dimension of installation opening 16 is larger than the largest exterior dimension of filter element 18 radial to filter axis 32. A base area of installation opening 16 is oblong flat-oval.

Housing pot 14 has axially between element space section 30 and outlet chamber section 24 a circumferentially closed sealing surface 34. Sealing surface 34 extends in the radial direction. Sealing surface 34 is facing housing cover 20. A seal 36 of filter element 18 sealingly abuts in a circumferentially closed manner at sealing surface 34.

The radial inner cross section of element space section 30 is greater than a radial outer cross section of sealing surface 34.

An inlet annulus 38 is realized between a radial outer circumferential side of filter element 18 and the radial inner circumferential side of element space section 30. Seal 36 separates inlet annulus 38 from outlet chamber section 24.

On the side facing housing cover 20, inlet annulus 38 is connected via a circumferential gap 40 to inlet chamber section 28. Inlet chamber area 28 and inlet annulus 38 are located on the raw air side of filter element 18.

A hollow cylindrical support buttress 42 is situated at housing cover 20. Support buttress 42 is integrally connected to housing cover 20. It is approximately coaxial to filter axis 32. It is, in relation to filter axis 32, centrally situated. In inlet chamber section 28, support buttress 42 extends from an interior side of housing cover 20 facing filter element 18 to an inlet-sided end face 66 of filter element 18. Support buttress 42 is located on the raw air side of filter medium 64. Support buttress 42 penetrates housing cover 20 and is open towards the surroundings.

Figure 11:
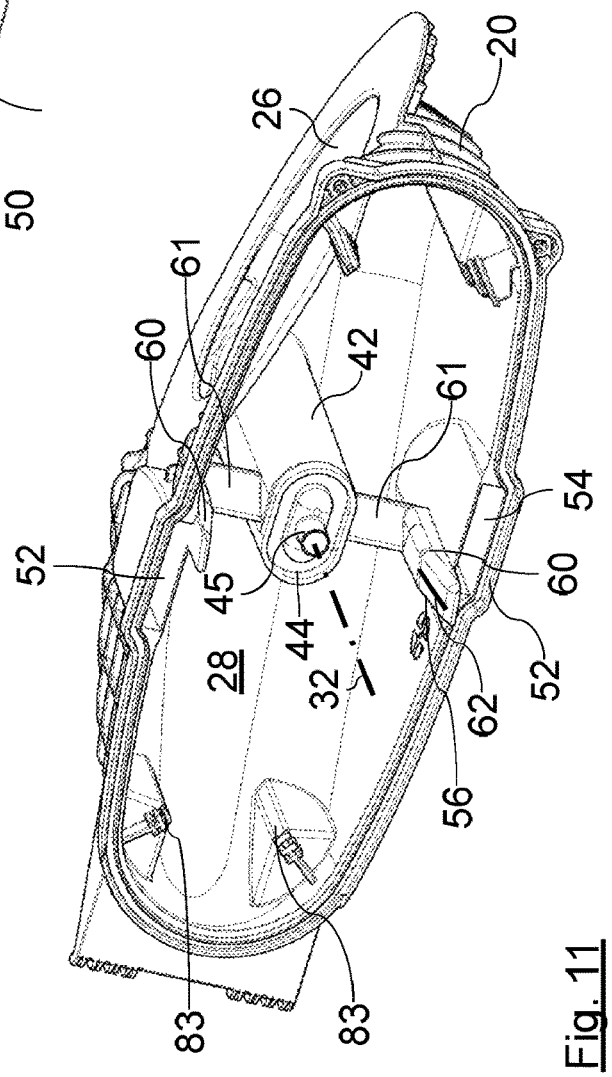
FIG. 11 shows an isometric illustration of the housing cover of the air filter from FIGS. 1 through 7, without the round filter element.

A coaxial counter support socket 44, which is, for example, shown in FIG. 11, running circumferentially to a major axis of support buttress 42, thus, to filter axis 32, is situated on the free end face of support buttress 42 facing filter element 18. Counter support socket 44 is an oval annular cavity in the end face of support buttress 42, which is open towards the free end face of support buttress 42.

A secondary air line connector 45 of a tubular secondary air line 47 passes through a section surrounded by counter support socket 44 of support buttress 42. Secondary air line 47 leads coaxially in the interior of support buttress 42 out of filter housing 12. Said secondary air line is, outside of filter housing 12, connected to a not-shown air line which leads to a compressor of a braking system of the motor vehicle.

Furthermore, housing pot 14 has two connecting lugs 46 for connecting with housing cover 20. Connecting lugs 46 are situated on the flattened, in relation to filter axis 32 opposite lying circumferential sides of housing pot 14. They are integrally attached respectively with one end at the free circumferential edge of housing pot 14, which surrounds installation opening 16. Connecting lugs 46 extend parallel to the installation axis of housing cover 20 having housing pot 14, thus, parallel to filter axis 32. Imaginary center axes of connecting lugs 46 lie in an imaginary plane with filter axis 32. This imaginary plane is, viewed in the direction of filter axis 32, slanted vis-a-vis another imaginary plane having a minor axis of oval installation opening 16. As it may be seen from, for example, FIG. 9, the imaginary center axes of connecting lugs 46 are, thus, on opposite-lying sides respectively laterally off-set to the minor axis.

The interior sides of connecting lugs 46 facing each other are flat. The interior sides of connecting lugs 46 form respectively one starting section of corresponding guide ramps 48. Guide ramps 48 continue at the inside of housing pot 14. Respective radial outer circumferential sides of an outlet-sided end plate 50 of filter element 18 are guided into housing pot 14 when installing filter element 18.

The outer sides of connecting lugs 46 facing away from each other are provided with stabilization profiles.

Connecting lugs 46 are tapered in a wedge-like manner at their free edges facing away from the free circumferential edge of housing pot 14. This simplifies the insertion of connecting lugs 46 into corresponding lug receptacles 52 of housing cover 20 for connecting housing pot 14 to housing cover 20.

Housing cover 20 has two lug receptacles 52. Lug receptacles 52 fit respectively one connecting lug 46 of housing pot 14.

Connecting lugs 52 are situated on the flattened, in relation to filter axis 32 opposite lying circumferential sides of housing cover 20. They are situated as integral parts in the area of the free circumferential edge of housing cover 20. Lug receptacles 52 are integrated into the circumferential wall of housing cover 20.

Connecting lugs 52 extend respectively parallel to the installation axis of housing cover 20 having housing pot 14, thus, parallel to filter axis 32. Imaginary center axes of connecting lugs 52 lie in one plane with filter axis 32. This imaginary plane is, viewed in the direction of filter axis 32, slanted vis-a-vis an imaginary plane having a minor axis of oval installation opening 16. The center axes of lug receptacles 52 are, thus, analogous to the center axes of connecting lugs 46, on opposite-lying sides laterally off-set to the minor axis. This is shown, for example, in FIG. 2.

Lug receptacles 52 are, in relation to their respective center axis, which run parallel to filter axis 32, circumferentially closed recesses. Connecting lugs 46 are held respectively in corresponding lug receptacle 52 on all circumferential sides. Lug receptacles 52 have on their side facing housing pot 14 a corresponding insert opening 54 for respective connecting lugs 46.

When housing cover 20 is installed, connecting lugs 46 mechanically stabilize the circumferential wall sections of housing cover 20. In this instance, connecting lugs 46 support the circumferential wall sections radially to filter axis 32, thus, radially to the element axis and to the housing axis.

Furthermore, housing cover 20 has two guide tracks 56 for guiding and supporting corresponding leveling elements 58 of filter element 18. One of guide tracks 56 is, for example, visible in FIG. 11. Guide tracks 56 are, in relation to filter axis 32, located on diagonally opposite, radial inner circumferential sides of housing cover 20.

Guide tracks 56 are realized at respectively one guide arm 60. Guide arms 60 are integrally connected by a longitudinal side inside of an interior space of housing cover 20, which concomitantly forms inlet chamber section 28, to the corresponding radial inner circumferential side of the circumferential wall of housing cover 20. The longitudinal sides respectively lying opposite of guide arms 60 form respective guide tracks 56. Respectively one cross brace 61 extends radially between the end of that guide arm 60 which is located respectively inside of housing cover 20 and support buttress 42. Cross braces 61 interlock respectively near the free end of support buttress 42. Cross braces 61 brace support buttress 42 against the circumferential wall of housing cover 20.

Guide arms 60 respectively projects out of the interior of housing cover 20. Outside of housing cover 20, guide arms 60 are each sloped on the radial inner longitudinal side having guide tracks 56. In this way, corresponding guide tracks 56 run, viewed in the direction of filter axis 32 towards the interior of housing cover 20, in the direction of filter axis 32.

Guide tracks 56 extend respectively by an imaginary main guide line 62 in a plane with the installation axis, thus, filter axis 32, of housing cover 20 having housing pot 14 and filter element 18. When snapping housing cover 20 onto filter element 18, main guide lines 62 specify a path of a contact area of corresponding leveling elements 58 when sliding down corresponding guide track 56. Main guide lines 62 are located in an imaginary minor plane which is spanned by the minor axis of the flat-oval base area of installation opening 16 and filter axis 32.

Figure 8:
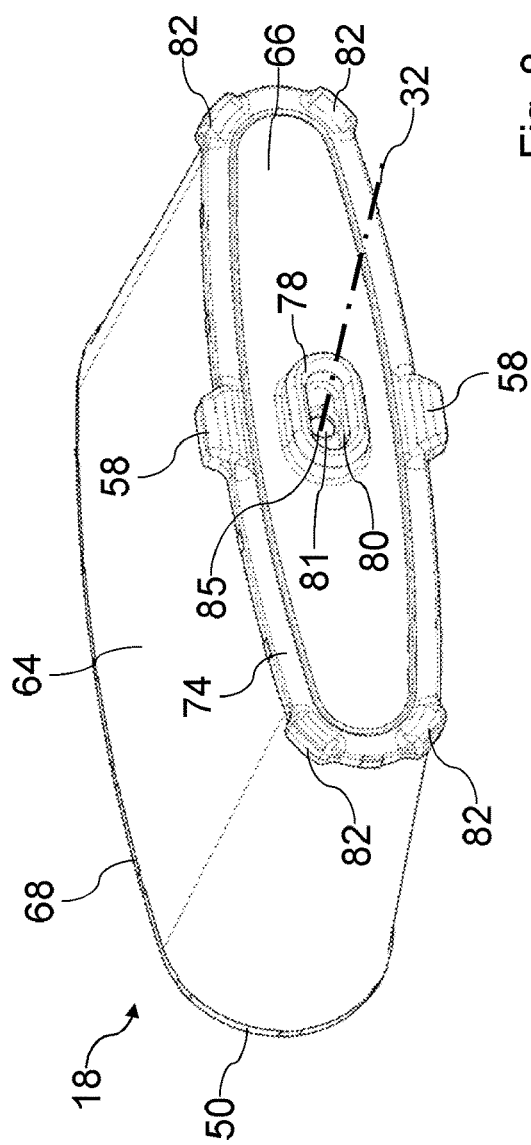
FIG. 8 shows an isometric illustration of the round filter element of the air filter from FIGS. 1 through 7.
Figure 9:
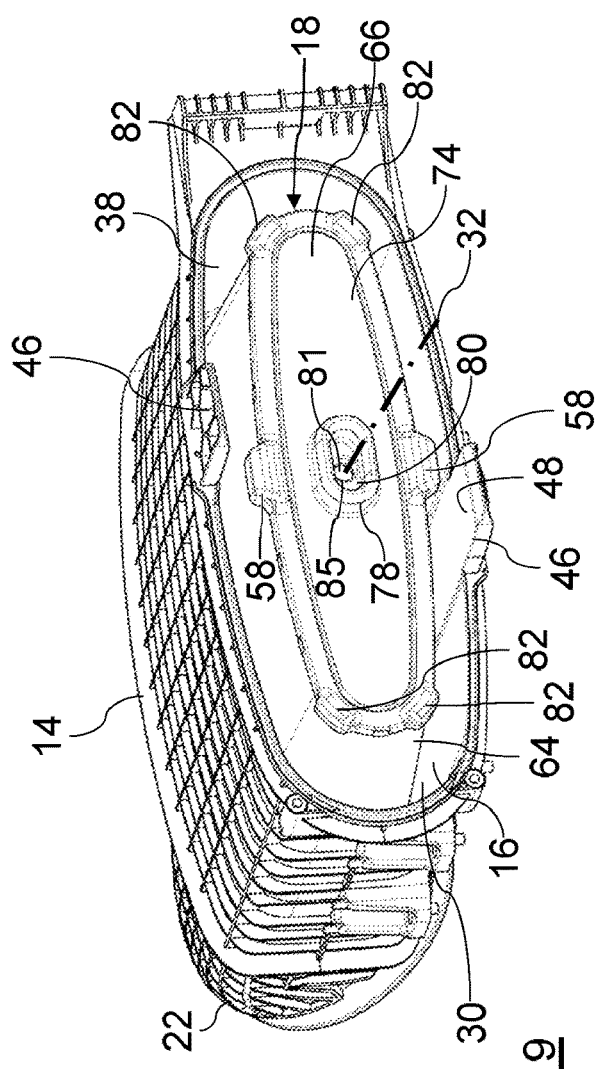
FIG. 9 shows an isometric illustration of the open housing pot of the air filter from FIGS. 1 through 7, having the round filter element.
Figure 9A:
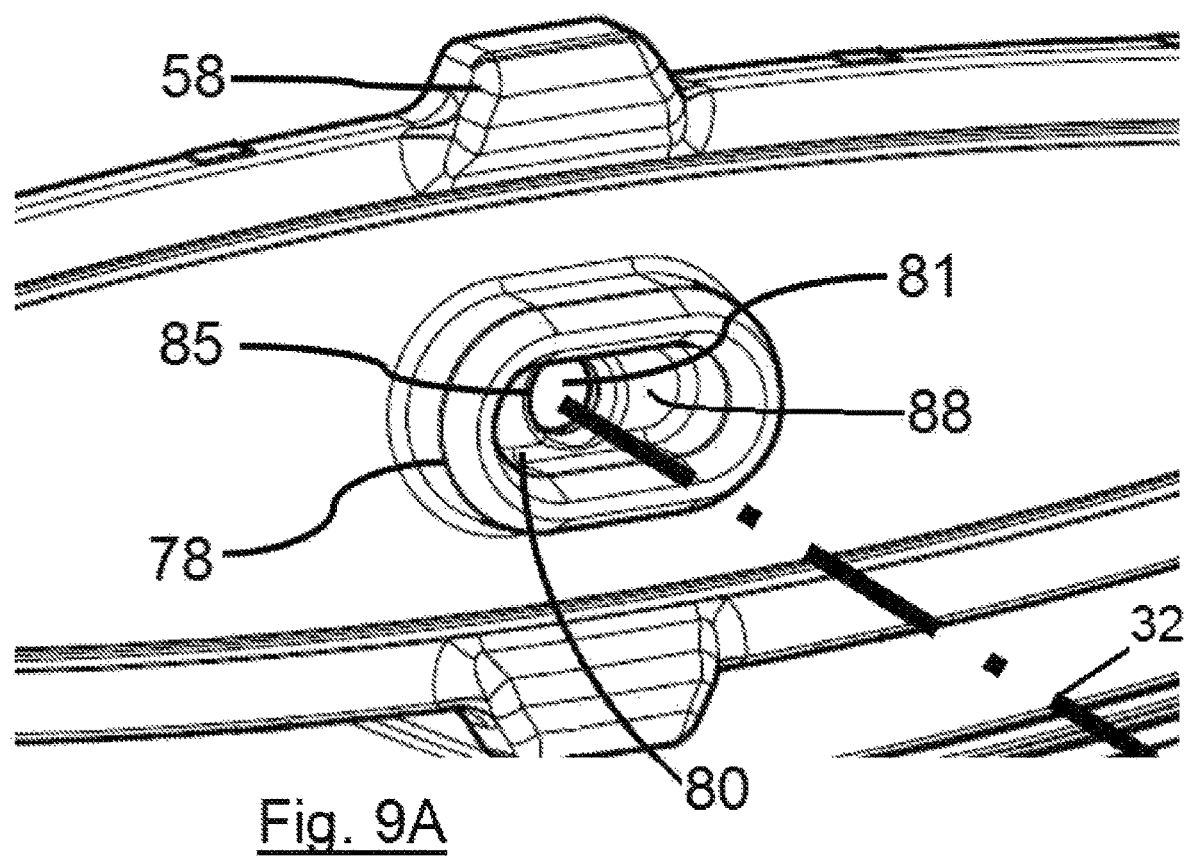
FIG. 9A shows an enlarged view of FIG. 9, showing the support element of FIG. 9 in a larger view.
Figure 10:
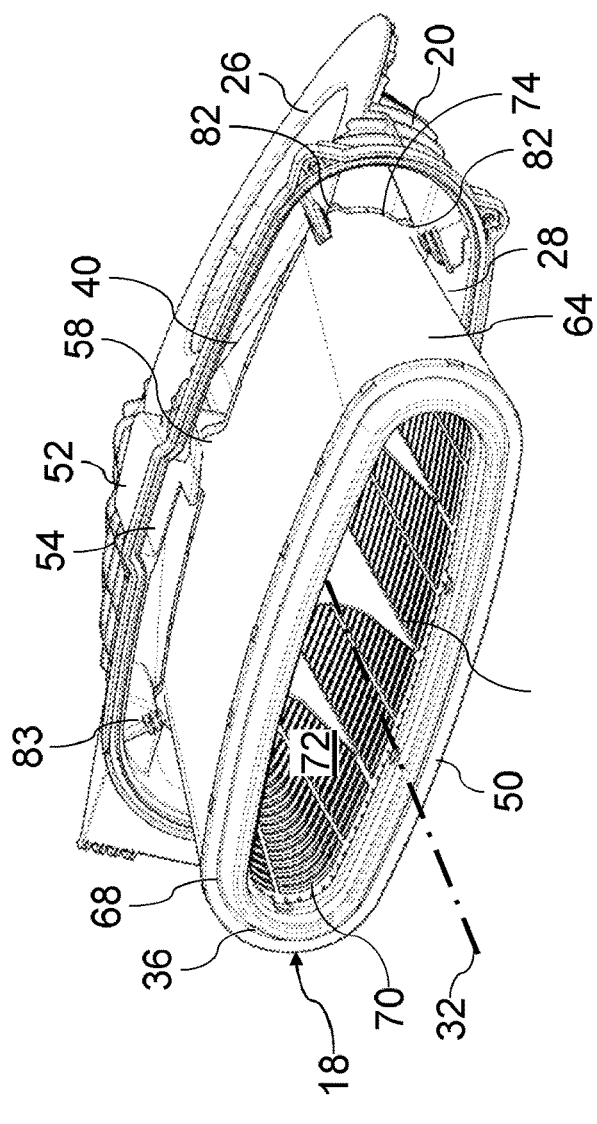
FIG. 10 shows an isometric illustration of the housing cover of the air filter from FIGS. 1 through 7, having the round filter element without the housing pot.

Filter element 18, which in the following is described in more detail, is, for example, shown in FIG. 8. Filter element 18 is a flat conical-oval round filter element. Filter element 18 is coaxial to the element axis, thus, to filter axis 32. Filter element 18 has a flat-oval cross section. The short transverse axis of the oval, thus, the minor axis, lies in the drawing plane of FIG. 3; the long transverse axis, thus, the major axis, is perpendicular to the drawing plane. In the direction of the short transverse axis, filter element 18 is additionally flattened; hence, the reference "flat conical-oval". In contrast, "oval" refers to an approximately elliptical cross section. A radial outer circumferential side and a radial inner circumferential side of filter element 18, each run conically in the direction of filter axis 32. The outer cross section and the inner cross section of filter element 18 taper from outlet-sided end face 68 facing outlet chamber section 24 in the direction of inlet-sided end face 66.

The direction of the minor axis of flat-oval filter element 18 runs, in the installed position, spatially vertical in the normal operating position. Filter axis 32 runs, in the installed position, spatially horizontal in the normal operating position.

Filter element 18 includes, in relation to the element axis, thus, to filter axis 32, a circumferentially closed filter medium 64 which is folded in a zigzag manner to form a filter bellows. Filter medium 64 is a filter fleece which is suitable for filtering air.

The expansion of the filter bellows from filter medium 64 in the radial direction to the element axis, thus, to filter axis 32, is smaller at its inlet-sided end face 66 than at its outlet-sided end face 68.

At its outlet-sided end face 68, filter medium 64 is connected to outlet-sided end plate 50. Outlet-sided end plate 50 is coaxial to filter axis 32. Outlet-sided end plate 50 is made out of a plastic. It is sealingly adhesively bonded to end face 68 of filter medium 64. The radial outer circumferential side of outlet-sided end plate 50 abuts having minimal clearance at the radial inner circumferential side of housing pot 14.

Outlet-sided end plate 50 has a central, coaxial outflow opening 70. Outflow opening 70 extends across the total radial inner cross section of filter medium 64. An element interior space 72 of filter element 18, which is surrounded by filter medium 64, is connected via outflow opening 70 to outlet chamber section 24.

At the outer side of outlet-sided end plate 50, lying axially opposite of filter medium 64, seal 36 is situated. Seal 36 is made out of elastic polyurethane foam. It is foamed onto outlet-sided end plate 50. Seal 36 is coaxial to the element axis, thus, to filter axis 32, and circumferentially surrounds outflow opening 70. It extends in the axial direction. It is supported in the axial direction at sealing surface 34 of housing pot 14.

At its inlet-sided end face 66, filter medium 64 is sealingly connected to an inlet-sided end plate 74. Inlet-sided end plate 74 is made out of polyurethane. Inlet-sided end plate 74 seals element interior space 72 in the direction of inlet chamber section 28. In a similar manner to outlet-sided end plate 50, inlet-sided end plate 74 is sealingly connected to filter medium 64.

A coaxial support tube 76 extends in element interior space 72 between inlet-sided end plate 74 and outlet-side end plate 50. Support tube 76 is made out of plastic. It has a lattice-like structure. Its circumferential side is permeable for air. Corresponding to filter medium 64, support tube 76 has a flat conical-oval shape. The radial inner circumferential side of filter medium 64 may be supported at the radial outer circumferential side of support tube 76.

At the axial outer side of inlet-sided end plate 74 facing away from element interior space 72, a support element 78 is situated. Support element 78 is located on the raw air side of filter medium 64. Support element 78 is fixedly connected with inlet-sided end plate 74. Support element 78 is made out of an elastic polyurethane foam. Support element 78 is foamed to inlet-sided end plate 74.

Support element 78 is sleeve-like. It has the shape of a hollow cylinder, the major axis of which extends, in the shown exemplary embodiment, coaxially to filter axis 32, thus, to the element axis. A cavity 80 of support element 78 is open on its end face facing away from inlet-sided end plate 74. On the other end face of support element 78, an approximately oval-like shaped bottom wall 88 closes an axial end of the cavity except for a circular air passage 81 which passes coaxially through the bottom wall at the inlet-sided end plate 74 and is connected to element interior space 72. If filter element 18 is correctly installed, secondary air line connector 45 passes through air passage 81 and, in this way, connects element interior space 72 with secondary air line 47

Furthermore, air passage 81 has a sealing device 85 to seal against the secondary air line connector 45. Sealing device 85 is realized as a soft-elastic two-part component, which is located at the radial inner circumferential side of air passage 81. Sealing device 85 surrounds the opening of air passage 81 in a coaxially and circumferentially contiguous manner. The radial inner circumferential side of sealing device 85 circumferentially abuts in a sealing manner at the radial outer circumferential side of secondary air line connector 45. Alternatively, sealing device 85 may also be a seal, for example, an O-ring seal or a sealing insert, which is inserted into the opening of air passage 81.

Support element 78 has an approximately oval-like cross section. Its short transverse axis lies in FIG. 3 in the drawing plane; the long transverse axis is perpendicular to the drawing plane. When filter element 18 is installed, the orientation of support element 78 in relation to filter axis 32 corresponds with the orientation of support buttress 42 of housing cover 20.

The section of support buttress 42 surrounded by counter-support socket 44 is, when filter element is correctly installed, inserted into cavity 80 of support element 78. In this instance, the circumferential wall of support element 78 is inserted into counter-support socket 44 of support buttress 42.

On its free side facing away from end plate 74, the wall thickness of support element 78 is reduced in a conical section towards the free edge. In this way, the insertion of support element 78 into counter-support socket 44 of support buttress 42 may be simplified.

Support element 48 braces filter element 18 via support buttress 42 against filter housing 12. The support is carried out radially, thus, transverse to filter axis 32, thus, transverse to the element axis and to the housing axis, and axially. In support element 48 acting together with support buttress 42, filter element 18 is radially and axially concomitantly held and positioned on the inlet side, thus, on the raw air side. In this way, filter element 18 may be concomitantly held on the side of filter housing 12 facing inlet chamber section 28.

Furthermore, respectively two supporting webs 82 are situated at the radial outer edges of inlet-sided end plate 74 in the area of the short transverse sides. Support webs 82 each protrude inlet-sided end plate 74 in the radial direction and also in the axial direction. Support webs 82 are each supported in the radial direction at corresponding supporting points 83, which are shown inter alia in FIGS. 3, 10 and 11, at the interior side of housing cover 20.

Leveling elements 58 already mentioned above are located radially outside at inlet-sided end plate 74 in relation to the element axis, thus, to filter axis 32. Leveling elements 58 are made out of polyurethane. They are integrally connected to inlet-sided end plate 74. Leveling elements 58 are situated on a raw air side of filter element 18.

Leveling elements 58 are, in relation to filter axis 32, situated on the diagonally opposite lying circumferential sides of inlet-sided end plate 74. Imaginary center points of leveling elements 58 are located in this instance on a minor axis of a flat-oval cross section of filter element 18.

In the direction of the minor axis, the filter bellows of filter element 18 has a smaller radial expansion on inlet-sided end face 66 than on outlet-sided end face 68. The minor axis lies in an imaginary plane which runs parallel to the flat-oval base area of filter element 18. The minor axis is the short axis of the imaginary plane through its center point. In contrast, the major axis is the long axis of the imaginary plane through its center point.

Leveling elements 58 each extend radially and axially outwards via the radial outer circumferential side of the filter bellows of filter medium 64 and inlet-sided end plate 74.

Distances from the radial outer circumferential side of leveling elements 58 from filter axis 32 correspond respectively with distances of the corresponding radial outer circumferential side of outlet-sided end plate 50 from filter axis 32.

When filter element 18 is in the final installation position, one of leveling elements 58 is, in its normal operating position, situated spatially on the bottom in filter housing 12. Other leveling element 58 is situated spatially on the top, perpendicular above first-mentioned leveling element 58.

In relation to filter axis 32, a uniform, radial distance between the radial outer circumference of inlet-sided end plate 74 and an opposite lying radial inner circumference of housing cover 20 is realized for forming gap 40 by way of leveling elements 58.

When filter housing 12 is installed, lug receptacles 52 having connecting lugs 46 are each situated approximately on the same circumferential side of filter housing 12, as one of guide tracks 56 for one of leveling elements 58. In this instance, lug receptacles 52/connecting lugs 46 and the corresponding leveling elements 58/guide tracks 56 are situated circumferentially off-set to one another, and lug receptacles 52/connecting lugs 46, viewed in the radial direction, overlap with corresponding leveling elements 58/guide tracks 56.

Guide tracks 56 are each situated between one of leveling elements 58 and one of lug receptacle 52/connecting lug 46. Connecting lugs 46/lug receptacles 52 brace guide tracks 56 against a pressure of leveling elements 58. Leveling elements 58 push from the inside against the respective circumferential wall section of housing cover 20. Connecting lugs 46 and corresponding lug receptacles 52 each hold up from the outside.

When operating air filter 10, the air to be filtered flows through inlet 26, which is indicated by an arrow 84 in FIG. 1, into inlet chamber section 28. From there, the air passes substantially in the axial direction through gap 40 into inlet annulus 38 on the inlet side of filter medium 64. The air flows through filter medium 64 from radially outside to radially inside and is cleaned. The cleaned air flows through the circumferential side of support tube 76 and reaches element interior space 72. The cleaned air exits element interior space 72 substantially in the axial direction and enters outlet chamber section 24. From there, the filtered air leaves filter housing 12 through outlet 22, which is indicated by an arrow 86 in FIG. 1.

Moreover, by means of secondary air line 47, cleaned air from the clean air side of element interior space 72 may be supplied to the compressor of the braking system.

For maintenance purposes, for example, for cleaning or exchanging filter element 18, filter housing 12 may be opened. In this instance, housing cover 12 is removed in the axial direction from housing pot 14. For this purpose, support element 78 is automatically pulled out from counter-support socket 44 at the end of support buttress 42 and secondary air line connector 45 is automatically pulled out from air passage 81. Connecting lugs 46 are pulled out from lug receptacles 52. Leveling elements 58 glide along guide tracks 56. Filter element 18 is pulled out in the axial direction from element interior space 30 of housing pot 14. It may be replaced by a new filter element 18 or be reinstalled after cleaning.

For the installation, filter element 18 is, with outlet-sided end plate 50 leading, inserted as far in the axial direction into housing pot 14 until seal 36 abuts at sealing surface 34. Subsequently, housing cover 20 is, with its open side leading, mounted in the axial direction onto installation opening 16 of housing pot 14. For this purpose, connecting lugs 46 are inserted into respective lug receptacle 52. In this way, housing cover 20 is pre-adjusted at housing pot 14.

When sliding housing cover 20 onto housing pot 14 in the axial direction, connecting lugs 46 and lug receptacles 52 act together as guides. As soon as the free ends of guide arms 60 of housing cover 20 reach leveling elements 58, guide arms 60 engage on radially opposite lying sides from the outside around leveling elements 58. When pushing housing cover 20 further, leveling elements 58 are guided along main guide lines 62 of guide tracks 56 to guide arms 60. When pushing housing cover 20 further, the side of filter element 18 having inlet-sided end plate 74 is continuously lifted into its final position by way of lower guide tracks 56. Filter element 18 is positioned and centered in housing cover 20. Finally, when pushing housing cover 20 further, support element 78 is automatically inserted into counter-support socket 44 of support buttress 42 and secondary air line connector 45 is inserted through air passage 81. In this instance, the radial inner section at the end of support buttress 42 engages into cavity 80 of support element 78. When correctly installed, the element axis runs coaxially to the housing axis. In a manner of no further interest here, housing cover 20 is finally fixed to housing pot 14.

Figure 12:
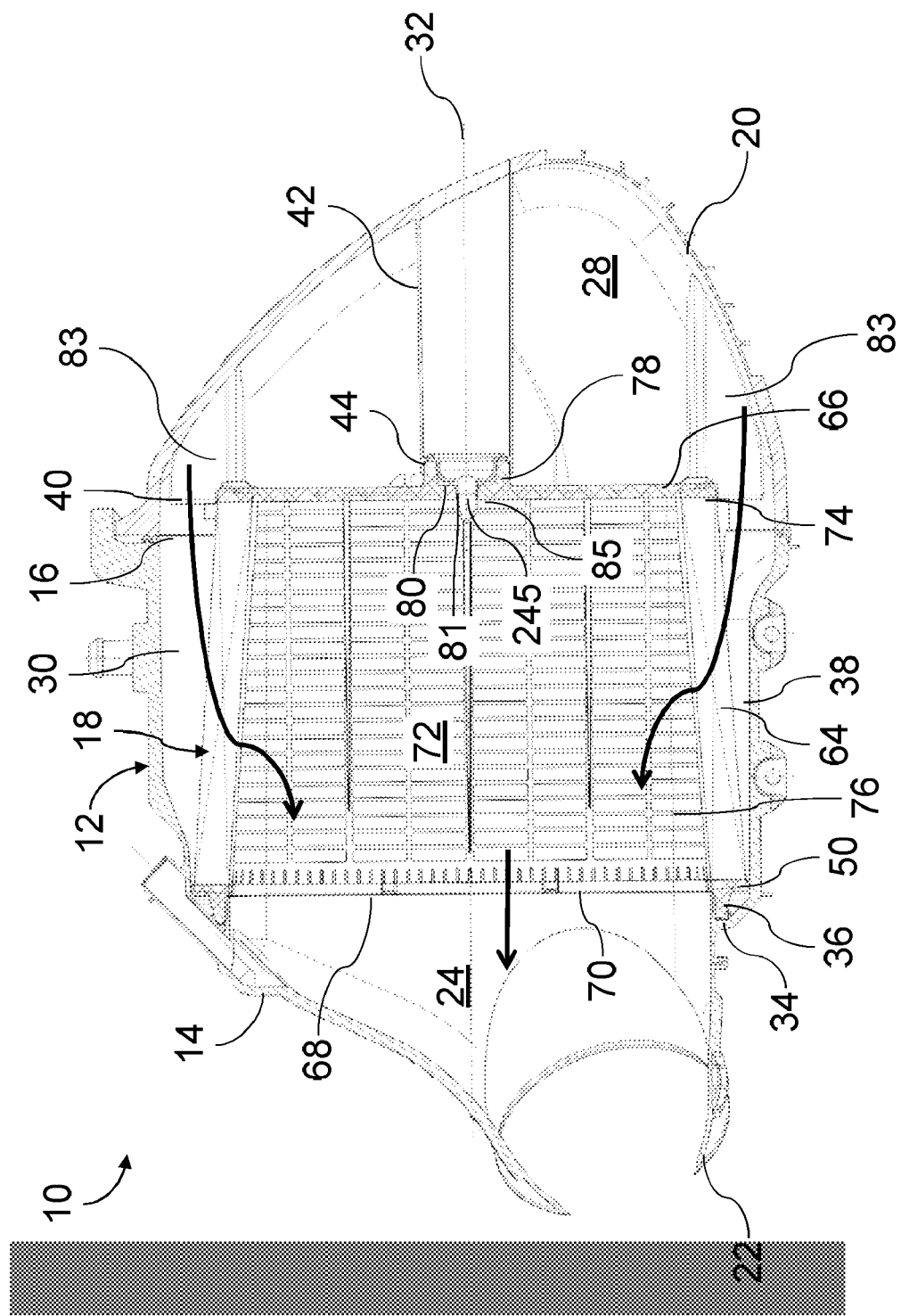
FIG. 12 shows a first longitudinal section of an air filter according to a second exemplary embodiment along the cutting line XII-XII from FIG. 13.
Figure 13:
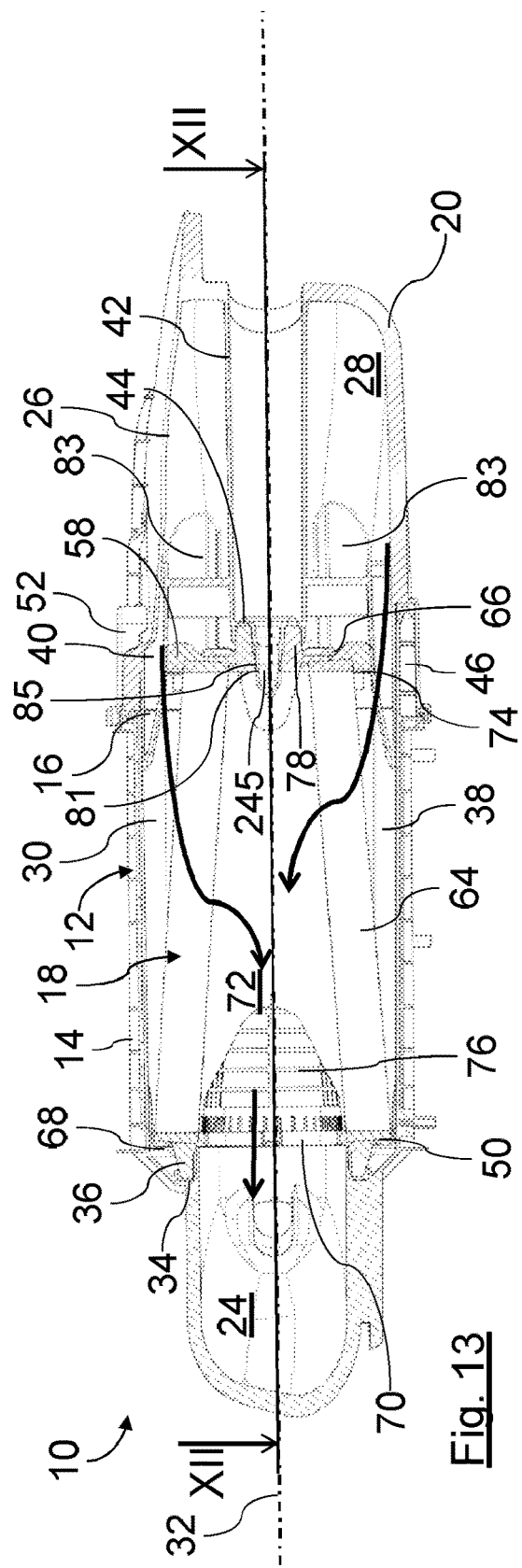
FIG. 13 shows a second longitudinal section of the air filter from FIG. 12.
Figure 14:
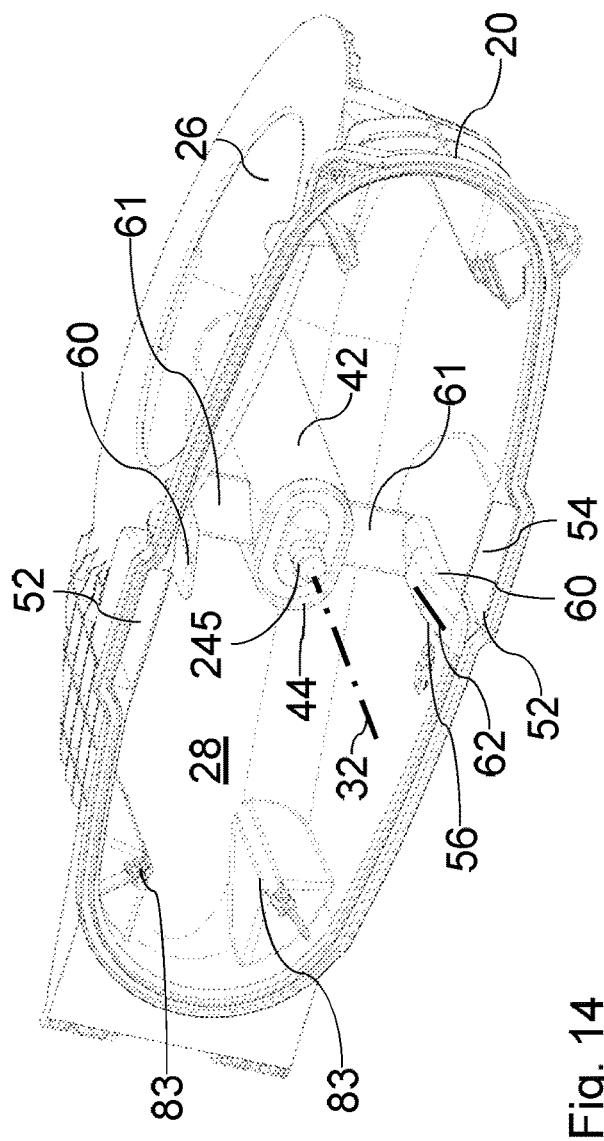
FIG. 14 shows an isometric illustration of the housing cover of the air filter from FIGS. 12 and 13, without the round filter element.

FIGS. 12 through 14 show an air filter 10 of an internal combustion engine of a construction vehicle according to a second exemplary embodiment in different illustrations and installation phases. In contrast to the first exemplary embodiment from FIGS. 1 through 11, filter housing 12 does not have a secondary air line in the second exemplary embodiment. Instead of the secondary air line connector, the second exemplary embodiment provides a positioning dome 245 made out of plastic at the end of support buttress 42. When filter element 18 is installed, positioning dome 245 grips into air passage 81. It centers and positions filter element 18 in its position in the transverse direction to the element axis. Positioning dome 245 serves to form a positioning device. Furthermore, positioning dome 245 spans filter element 18 in the axial direction in filter housing 12. Moreover, positioning dome 245 seals air passage 81. In this way, same filter element 18 from the first exemplary embodiment may be used in the second exemplary embodiment of air filter 10.

Positioning dome 245 tapers at the free end which simplifies the insertion into air passage 81. When assembling air filter 10, positioning dome 245 guides and positions filter element 18 at inlet-sided end face 66 in the transverse direction, thus, also radially to filter axis 32.

When operating air filter 10, movements and vibrations of filter element 10 are reliably and safely compensated by way of positioning dome 245 and support element 78 acting together. Filter element 18 is held in its position and is fixed into place. It is prevented that filter element 18 slides in the transverse direction.

What is claimed is:

1. A hollow filter element, comprising:
a filter medium for filtering the fluid, the filter medium circumferentially surrounding an element interior space in relation to an element axis, forming a conical-oval round filter element;
wherein the hollow filter element includes:
  a first end plate arranged on a first axial end of the hollow filter element, the first end plate and having a central coaxial outflow opening which opens into the element interior space;
  a second end plate arranged on an opposite second axial end of the hollow filter element, the second end plate having:
    a hollow oval sleeve-like projection, projecting axially outwardly from an outer surface of the second end plate and axially outwardly away from the element interior space, the hollow oval sleeve-like projection surrounding a cavity therein, the hollow oval sleeve-like projection having:
      a first axial end arranged on the outer surface the second end plate;
      a second axial end spaced axially outwardly away from the outer surface the second end plate;
      an annular surface arranged on the second axial end surrounding the cavity, the cavity opening through the annular surface to an exterior;
      an oval shaped bottom wall closing the cavity at the first axial end of the hollow cylindrical sleeve-like projection;
      at least one fluid opening arranged in the bottom wall and connecting the cavity to the interior space, such that the central coaxial outflow opening of the first end plate and the at least one fluid opening of the second end plate both open into the element interior space at opposite axial ends of the hollow filter element;
    wherein the hollow oval sleeve-like projection is configured to support the hollow filter element at a housing-sided support section of a filter housing; and
    wherein the at least one fluid opening in the bottom wall of the hollow oval sleeve-like projection is configured to receive and seal to a secondary fluid line connector of a housing-sided secondary fluid line and/or for receiving a housing-sided positioning dome.

2. The hollow filter element according to claim 1, wherein the cavity which, at least when the hollow filter element is not installed, is connected to the at least one fluid opening and is open on its side facing away from the fluid opening.

3. The hollow filter element according to claim 1, wherein the at least one fluid opening is circumferentially closed by an annular wall extending from the bottom wall to the interior space;
an elastic annular seal arranged on a radially inner side of the annular wall, the elastic annular seal projecting radially inwardly into the at least one fluid opening;
wherein the elastic annular seal is at least one part of a sealing device for sealing against the secondary fluid line connector of the housing-sided secondary fluid line and/or the housing-sided positioning dome.

4. The hollow filter element according to claim 1, wherein the at least one fluid opening is connected to a clean fluid side of the filter medium.

5. The hollow filter element according to claim 1, wherein the hollow filter element has at least on one circumferential side, in relation to the element axis, at least one leveling element configured for supporting the filter element against the filter housing.

6. A filter housing of a filter for fluid, comprising
at least one housing part enclosing an interior configured for receiving the hollow filter element according to claim 1, the at least one housing part openable to receive the hollow filter element;
at least one inlet for fluid to be cleaned;
at least one outlet for cleaned fluid;
wherein the filter element can be replaceably installed in the filter housing in such a manner that it separates the at least one inlet from the at least one outlet;
at least one housing-sided support section is situated in/at the filter housing, at which the filter element is supported by the hollow oval sleeve-like projection located at one of the end faces of the hollow filter element; and
a positioning device provided in an interior of the filter housing, the positioning device including:
  a support buttress formed as a projection, the support buttress formed on a wall in the interior of the filter housing and projecting inwardly towards the filter element, the support buttress configured to supportively engage the filter element, the support buttress including:
    an oval shaped buttress end face arranged on an inwardly projecting axial end of the support buttress;
  a tubular support dome, formed as a tubular projection on the buttress end face, projecting axially outwardly from the buttress end face, the a tubular support dome configured to be received into the at least one circular fluid opening formed in the bottom wall of the hollow oval sleeve-like projection of the filter element;
  a coaxial counter support socket formed as a tubular projection arranged on and projecting axially outwardly away from the buttress end face;
  the coaxial counter support socket spaced radially away from and circumferentially surrounding the tubular support dome;
  wherein an annular cavity is formed at the buttress end face between the coaxial counter support socket and the tubular support dome;
  wherein the tubular support dome of the filter housing connects to a fluid passage in the at least one fluid opening of the hollow oval sleeve-like projection of the filter element, connecting to an element interior space of the filter element.

7. The filter housing according to claim 6
wherein the at least one housing part is at least two housing parts, including
  a housing pot; and
  a housing cover which can at least partially be separated from the housing pot for installing/removing the hollow filter element.

8. The filter housing according to one of claim 7, wherein the housing cover has at least one guide track which extends at least along one imaginary main guide line in a plane with an installation axis of the hollow filter element into the housing cover for guiding and supporting the at least one leveling element which is, in relation to the filter axis, is arranged radial outside at an end face at a first end body of the hollow filter element.

9. The filter housing according to claim 7, wherein
the housing pot and/or the housing cover, has at least one connecting lug for connecting to the respectively other housing part of the filter housing.

10. A filter for fluid, comprising:
a hollow filter element;
a filter housing according to claim 6;
wherein the hollow filter element includes:
  a filter medium for filtering the fluid, the filter medium circumferentially surrounding an element interior space in relation to an element axis, forming a conical-oval round filter element;
wherein the hollow filter element includes:
  a first end plate arranged on a first axial end of the hollow filter element, the first end plate and having a central coaxial outflow opening which opens into the element interior space;
  a second end plate arranged on an opposite second axial end of the hollow filter element, the second end plate having:
    a hollow oval sleeve-like projection, projecting axially outwardly from an outer surface of the second end plate and axially outwardly away from the element interior space, the hollow oval sleeve-like projection surrounding a cavity therein, the hollow oval sleeve-like projection having:
      a first axial end arranged on the outer surface the second end plate;
      a second axial end spaced axially outwardly away from the outer surface the second end plate;
      an annular surface arranged on the second axial end surrounding the cavity, the cavity opening through the annular surface to an exterior;
      an oval shaped bottom wall closing the cavity at the first axial end of the hollow cylindrical sleeve-like projection;
      at least one fluid opening arranged in the bottom wall and connecting the cavity to the interior space, such that the central coaxial outflow opening of the first end plate and the at least one fluid opening of the second end plate both open into the element interior space at opposite axial ends of the hollow filter element;
wherein the at least one fluid opening of the hollow oval sleeve-like projection receives and seals to the tubular support dome of the filter housing;
wherein the filter element is replaceably installed in the filter housing in such a manner that it separates the at least one inlet from the at least one outlet.

* * * * *